United States Patent [19]

Plecki

[11] Patent Number: 5,060,997
[45] Date of Patent: Oct. 29, 1991

[54] WEED REMOVING DEVICE

[76] Inventor: Michael J. Plecki, 4936 Spring Rd., Oak Lawn, Ill. 60453

[21] Appl. No.: 471,405

[22] Filed: Jan. 29, 1990

[51] Int. Cl.$^5$ .............................................. A01B 1/16
[52] U.S. Cl. .................................. 294/50.6; 172/25; 172/371
[58] Field of Search ................. 294/19.1, 50–50.7, 294/51, 61, 121, 126; 7/114; 43/6; 30/276, 347, 356, 310; 81/8.1; 172/22, 25, 37, 41, 371, 378, 381; 175/398, 415; 254/132

[56] References Cited

U.S. PATENT DOCUMENTS

| | | | |
|---|---|---|---|
| 799,359 | 9/1905 | Shaffer | 172/25 |
| 843,399 | 2/1907 | King | 294/50.6 |
| 1,107,705 | 8/1914 | Ruddy . | |
| 1,131,714 | 3/1915 | Kress . | |
| 1,293,824 | 2/1919 | Ludwig . | |
| 1,484,948 | 2/1924 | Kimberlin . | |
| 1,528,157 | 3/1925 | Leyden | 294/50.6 |
| 1,725,191 | 8/1929 | Holmes . | |
| 1,867,086 | 7/1932 | Meixell | 294/50.6 X |
| 1,951,978 | 3/1934 | Haskins | 294/50.6 |
| 2,194,336 | 3/1940 | Tullio | 294/50.6 |
| 2,207,661 | 7/1940 | Dugan | 294/61 X |
| 2,492,035 | 12/1949 | Doble | 294/50.6 |
| 2,791,879 | 5/1957 | Truran | 172/378 |
| 2,809,067 | 10/1957 | Macchi | 294/50.6 X |
| 2,843,359 | 7/1958 | Franz et al. | 254/132 |
| 2,860,001 | 11/1958 | Garland | 294/50.6 |
| 3,985,382 | 10/1976 | Wheeler | 294/50.6 |
| 4,456,075 | 6/1984 | Hostetter | 294/50.6 X |
| 4,618,003 | 10/1986 | Hostetter | 294/50.6 X |
| 4,723,802 | 2/1988 | Fambrough | 294/50.6 |
| 4,819,736 | 4/1989 | Hedgepeth | 294/50.6 X |

FOREIGN PATENT DOCUMENTS

| | | | |
|---|---|---|---|
| 516979 | 4/1921 | France | 254/132 |
| 862793 | 3/1961 | United Kingdom | 172/25 |

Primary Examiner—Johnny D. Cherry
Attorney, Agent, or Firm—Patula & Associates

[57] ABSTRACT

A weed removing device with a shaft having a handle end and blade end. A T-shaped handle is configured on the handle end at a sufficient distance away from the blade end to provide leverage in pushing, pulling and rotating the device. A blade is located at the blade end having an axis member extended axially from the shaft and a blade member extended laterally from the axis member. The blade end of the shaft is submerged into soil until the axis member is in close longitudinal juxtaposition with the main tap root of a weed to be removed. The T-handle is then turned to rotate the shaft, thereby cutting small lateral roots upon contact with a forward edge of the blade member and thereby also twisting the main tap root around the axis member then for removing the weed and root upon withdrawal of the device from the soil.

17 Claims, 3 Drawing Sheets

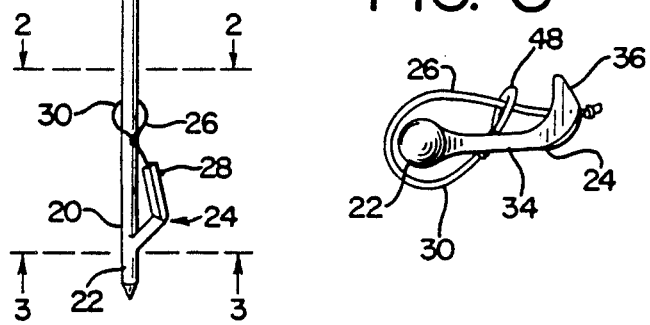
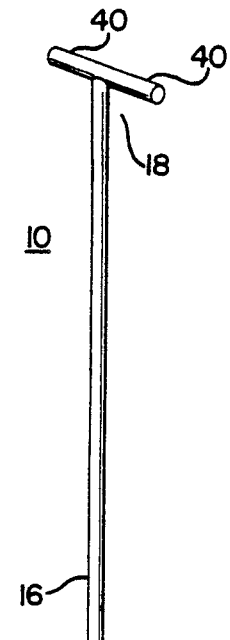
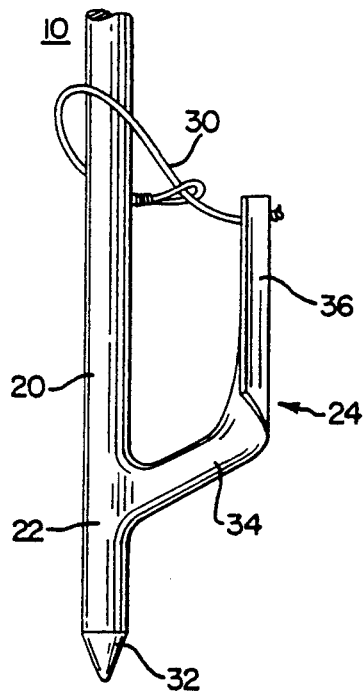
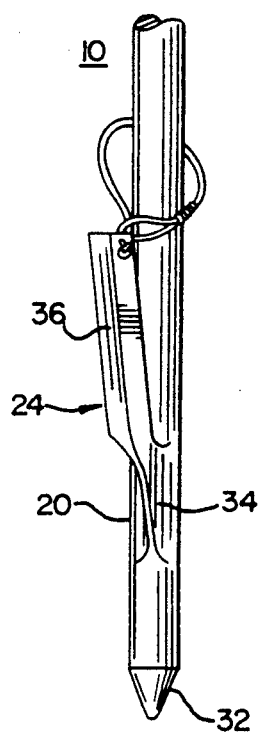
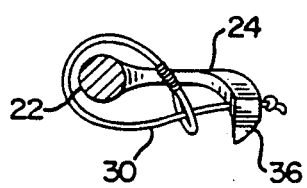
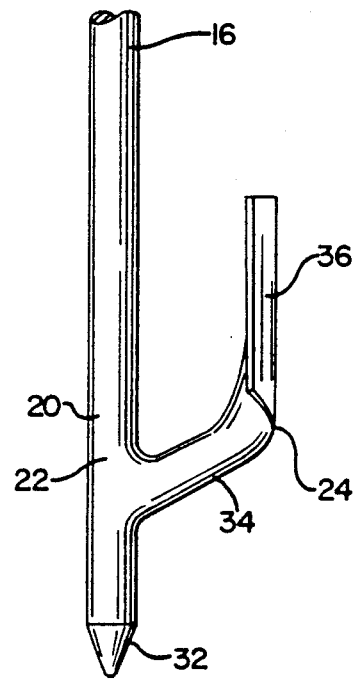

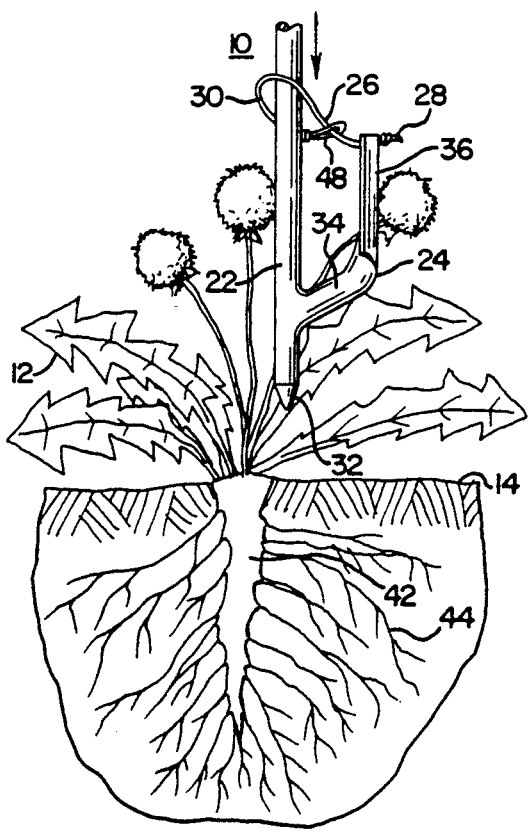
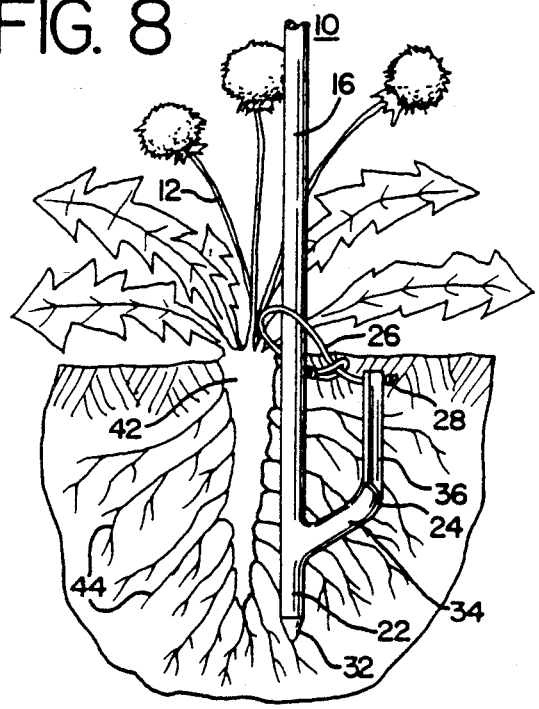
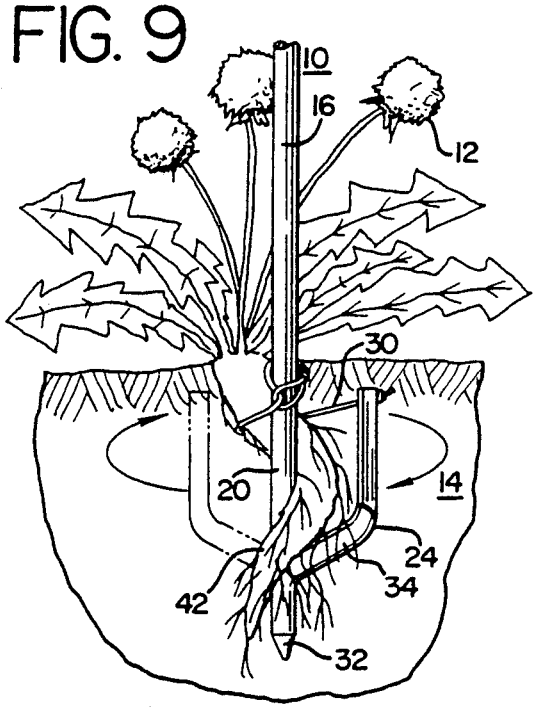
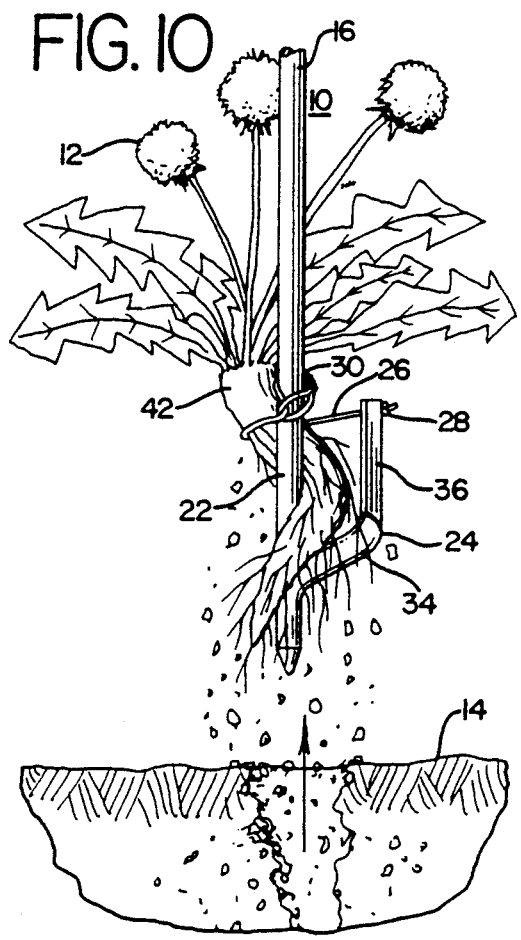

5,060,997

WEED REMOVING DEVICE

This invention relates generally to an improved device for completely removing broad leaf weeds and their extensive root systems containing a main tap root from a lawn or garden without excessive damage to the surrounding grass or soil.

BACKGROUND OF THE INVENTION

For as long as people have been cultivating grass and other plants they have had to determine how to effectively and easily remove weeds. The most difficult weeds to remove have always been broad leaf weeds with their extensive roots system and main tap root. Most conventional methods of weed removal result in either merely breaking off the top of the weed, leaving the root to grow back or alternatively, digging the weed from the ground, leaving a large unsightly hole in its place.

Various devices have been developed over the years in an attempt to remove the entire weed and its root, without leaving a large hole in its place. These devices have focused on securing a good grip on the substratum of the weed, where the leaves meet the roots, and prying it, and hopefully its root, from the ground. The majority of these devices have necessitated that the user crouch on the ground beside the weed in order to use the device.

While these devices may have resulted in a secure grip on the weed, they still often either slip off the weed, stripping the leaves from the roots, or merely break the top of the weed off. The result is still that most of the time the roots remain in the ground to grow back. Another problem with these devices is that when the roots are removed they tend to leave a large unsightly hole in the lawn or garden, due to the prying motion which must be used to remove the root from the ground.

The principal object of the present invention is to secure the root of the weed and to thereby remove the entire tap root from the ground.

Another object of this invention is to secure the root in such a way that it is removed directly from the ground, without leaving a hole much larger than the diameter of the root itself.

A further object of this invention is to allow it to be used while the user is standing in an erect position, applying a minimum amount of effort, thereby allowing it be used by elderly and slightly handicapped people.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE INVENTION

The device, in one of its many embodiments, could be manufactured from a strong, yet light weight material to form a shaft having a tee or "T" shaped handle at one end and a cutting blade at the other. The shaft could be about waist high to allow sufficient pressure to be applied from a standing position to insert the cutting blade into the ground alongside and parallel to the main stem and tap root of the weed. Additionally, the handle contains an indication marker to note the cutting blade position when the device is in operation.

The cutting blade has an axis or axial member, extending straight down from and coaxial with the shaft, with a blade member extending laterally from the axis or axial member. Both members can be connected by a cable fastened to the blade member and movably attached to the axial member by a loop.

In general, the device is used by inserting the cutting blade into the dirt alongside and roughly parallel to the main stem and tap root of the weed. The device is then rotated in the ground by turning the T handle approximately 360 degrees. The extent of the rotation can be determined by watching the indication marker on the handle. This rotation causes the smaller lateral roots to be cut and the main tap root to be wrapped around the cutting blade and secured by the cable. In addition, the rotation of the cutting blade loosens the dirt surrounding the roots, allowing the easy removal of the weed.

When the rotation is complete, the device is then lifted straight out of the ground, with the weed and its roots attached. The hole which is left is only slightly larger than the width of the root itself and can easily be filled in by stepping on it with the heel of the user's shoe.

BRIEF DESCRIPTION OF THE DRAWINGS

Further understanding of drawings may be had by reference to the accompanying drawing wherein:

FIG. 1 is a perspective view of the present invention in the preferred embodiment.

FIG. 2 is a front view of the device in its preferred embodiment.

FIG. 3 is a side view of the device, rotated approximately 90°.

FIG. 4 is a vertical view of the device along the line 2—2 of FIG. 1.

FIG. 5 is another vertical view along the line 3—3 of FIG. 1.

FIG. 6 shows another embodiment of the blade end of the device, without the cable.

FIG. 7 is a front view of the device just prior to insertion into the soil beside the tap root.

FIG. 8 is a front view of the device after insertion into the soil beside a tap root to a desired cutting depth.

FIG. 9 is a front view of the device after insertion into the soil with a rotation of the device in the soil shown in phantom.

FIG. 10 is a front view of the device after the tap root is entwined and the device and weed have been removed from the soil.

DESCRIPTION OF THE PREFERRED EMBODIMENT

Figure 11:
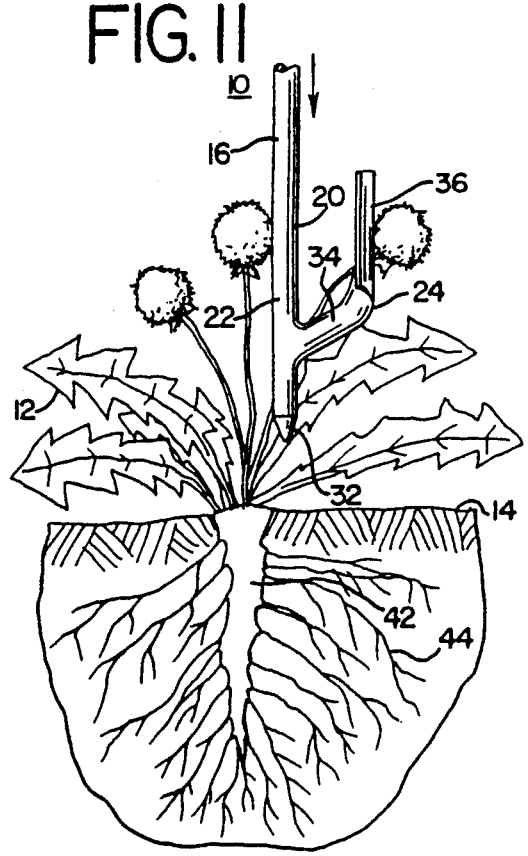
FIG. 11 is a front view of the device, in another embodiment, without the cable, just prior to insertion into the ground.

While this invention is susceptible of embodiment in many different forms, there is shown in the drawings and will herein be described in detail a preferred embodiment of this invention. The invention disclosed herein is equally applicable to many such devices besides the embodiment shown and described below. It should be understood, however, that the present disclosure is to be considered as an exemplification of the principles of the invention and is not intended to limit the spirit and the scope of the invention and/or claims to the embodiment illustrated.

Referring now to the figure drawings, FIG. 1 is a perspective view of the preferred embodiment of the device 10 for removing a weed 12 from the ground 14 (see FIG. 7). The device 10 is comprised of an elongate shaft 16 having a handle end 18 and a blade end 20. The indication marker 46 is shown on the handle end 18.

The blade end 20 of the device 10 is comprised of an axial or axis member 22 extending axially from said shaft 16 and a blade member 24 extending generally laterally from the axis member 22. Attached to the blade member 24 is a cable 26 having a fastened end 28 fastened to the blade member 24 and a movable end 30 which is slidably attached along the axis member 22 by a loop 48.

The handle end 18 is comprised of a handle 38, having two grip portions 40 radially extending perpendicular to the shaft 16.

FIG. 2 is a front view and FIG. 3 is a side view, with FIG. 3 rotated approximately 90°, of the blade end 20 of the device 10 further showing the blade axis tip 32 extending axially from said axis member 22 and further showing the blade member 24 with a first portion 34 extending generally laterally from the axis member 22 and a second portion 36 extending from the first portion 34 in a parallel alignment with the shaft 20 upwards towards the handle end 18.

FIG. 4 is a cut-away view of the blade end 20 of the device 10 taken along the line 2—2 of FIG. 1. It shows the axis member 22, the cable 26 with its fastened end 28 and the loop end 30. Also shown is the blade member 24 with its first portion 34 and its second portion 36.

FIG. 5 is a partial cut-away view of the device 10 along the line 3—3 of FIG. 1 showing the axis member 22, the blade member 24 with its first portion 34 and its second portion 36, and further showing the cable 26 with its fastened end 28 and its loop end 30.

FIG. 7 shows the device 10 being inserted into the ground 14 alongside the weed 12. Also shown is the axis member 22, the blade axis tip 32, the blade member 24 with its first portion 34 and its second portion 36 along with the cable 26.

FIG. 8 shows the device 10 inserted into the ground 14 along side the main tap root 42 of the weed 12. Also shown are the blade end 20 with its axis member 22 and its blade member 24 including its first portion 34 and its second portion 36, the cable 26 attached with its fastened end 28 and its loop end 30.

FIG. 9 shows the device 10 inserted into the ground 14 along the main tap root 42 of the weed 12. The device is being rotated in a clock-wise direction around the main tap root 42. Also shown is the blade axis tip 32 upon which the device is being rotated, the shaft 16, the blade end 20 which includes the axis member 22 and the blade member 24. The second portion 36 of the blade member 24 is shown rotating through the ground 14, cutting the lateral roots 44 of the weed 12. The main root 42 is shown being caught by the first portion 34 of the blade member 24 and wrapped around the axis member 22. The cable 26 is shown further securing the main tap root 42 as the device 10 is rotated in the ground 14.

FIG. 10 shows the device 10 and the weed 12 being removed from the ground 14. The main tap root 42 is shown wound around the cutting blade 20, specifically the axis member 22, after being caught by the first portion 34 of the blade member 24. Also shown is the cable 26 further securing the root 42 to the device 10. The weed 12 is unwrapped from the device 10 and the cable 26 along the axis member 22 to loosen and remove soil and debris from the device 10.

Figure 12:
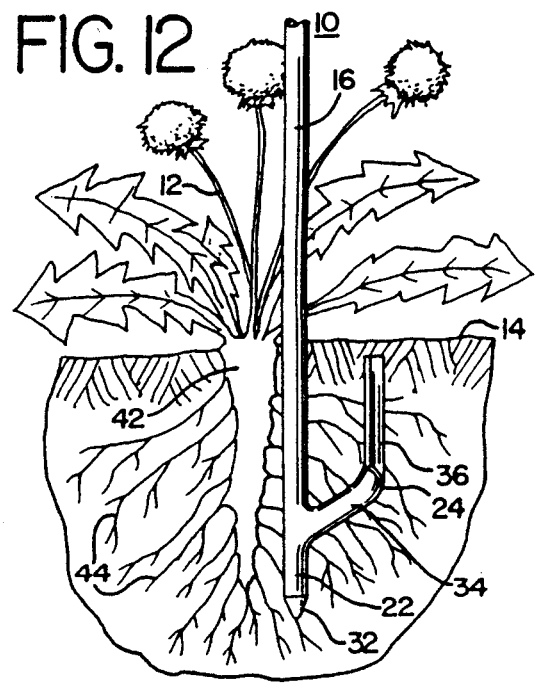
FIG. 12 is a front view of the device, without the cable, after insertion into the ground.
Figure 13:
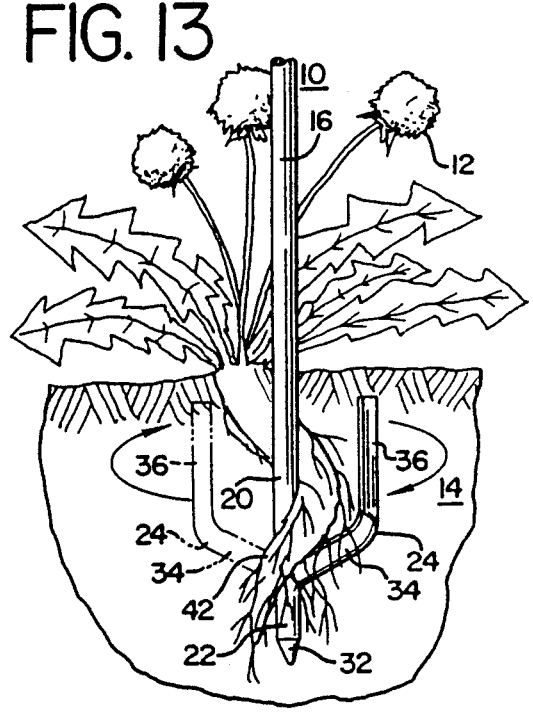
FIG. 13 is a front view of the device without the cable, showing the device after insertion into the ground, with rotation of the device shown in phantom.
Figure 14:
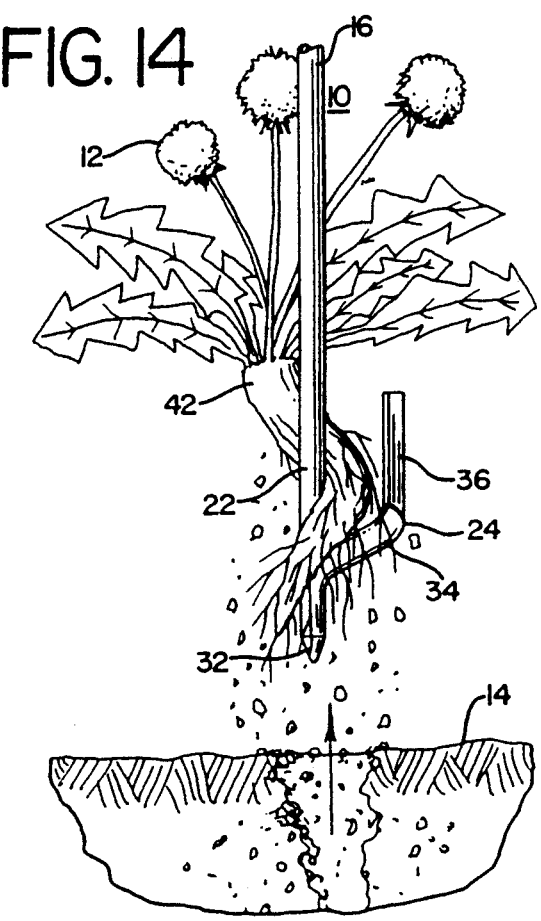
FIG. 14 is a front view of the device being removed from the ground with the weed and root securely entwined thereon.

FIGS. 6, 11–14 depict another embodiment of the invention without cable 26 as shown in FIGS. 6–10. The operation of the device 10 as shown in the embodiment of FIGS. 11–14 operates the same as the embodiment shown in FIGS. 6–10.

While the foregoing has presented certain specific embodiments of the present invention, it is understood that these embodiments have been presented by way of example only. It is expected that others will perceive variations which, while differing from the foregoing, do not depart from the spirit and scope of the invention as herein described and claimed.

What I claim is:

1. A weed removing device, comprising:
a shaft having a handle end and a blade end;
handle means located on said shaft end at a sufficient distance away from said blade end to provide leverage in pushing, pulling and rotating said device; and
blade means located at said blade end of said shaft, having an axis member extended axially from said shaft and a blade member extended laterally from said axis member, said blade member having laterally and vertically extending portions, said lateral portion being shorter than said vertically extending portion, said vertical extending portion having a tapered edge, so that said blade end of said shaft is submerged into soil until said axis member is in close longitudinal juxtaposition with the main tap root of a weed to be removed, with said handle means then turned to rotate said shaft, thereby cutting small lateral roots upon contact with and forward rotational force of said tapered edge of said blade member and thereby also twisting the main tap root around said axis member, for removing the weed and root upon withdrawal of said device from the soil.

2. The device recited in claim 1, wherein:
said handle means is located at said handle end of said shaft.

3. The device recited in claim 1, wherein:
said handle means is an elongated member having a midpoint at which said handle means is affixed to said shaft in perpendicular alignment therewith to form a T-shaped configuration relative to said shaft;
said handle means further defined by an indication mark aligned with said blade member to indicate the position of said blade member before, during and after rotation, after said device is submerged in soil.

4. The device recited in claim 1, wherein:
said blade means is further defined by said blade member having a first portion depended laterally from said axis member, and a second portion extending from said first portion, in parallel alignment with said shaft, upward toward said handle end.

5. A weed removing device, comprising:
a shaft having a handle end and a blade end;

a handle means located on said shaft and at a sufficient distance away from said blade end to provide leverage in pushing, pulling and rotating said device;

blade means located at said blade end of said shaft, having an axis member extended axially from said shaft and a blade member extended laterally from said axis member; said blade member having laterally and vertically extending portions, said lateral portion being shorter than said vertically extending portion, said vertical extending portion having a tapered edge, so that said blade end of said shaft is submerged into soil until said axis member is in close longitudinal juxtaposition with the main tap root of a weed to be removed, said handle means then turned to rotate said shaft, thereby cutting small lateral roots upon contact with and forward rotational force of said tapered edge of said blade member and thereby also twisting the main tap root around said axis member, then removing the weed and root upon withdrawal of said device from the soil; and said blade means is further defined by a cable having a fastened end fixed to said blade member and a movable end looped around said axis member of said shaft, said movable end being slidable along said axis member.

6. A weed removing device, comprising:

a shaft having a handle end and a blade end;

a handle located on said shaft at said handle end having two grip portions radially extending perpendicular to said shaft and opposite each other in a common plane;

blade means located at said blade end of said shaft, having an axis member extended axially from said shaft and a blade member extended laterally from said axis member; said blade member having laterally and vertically extending portions, said lateral portion being shorter than said vertically extending portion, said vertical extending portion having a tapered edge, so that said blade end of said shaft is submerged into soil until said axis member is in close longitudinal juxtaposition with the main tap root of a weed to be removed, with each of said grip portions of said handle then turned to rotate said shaft, thereby cutting small lateral roots upon contact with and forward rotational force of said tapered edge of said blade member and thereby also twisting the main tap root around said axis member, then removing the weed and root upon withdrawal of said device from the soil.

7. The device recited in claim 6, wherein:

said blade end terminates at a blade axis tip extended axially from said axis member upon which said device is centered and pivoted to effect weed removal.

8. The device recited in claim 6, wherein:

said blade means is further defined by said blade member having a first portion depended laterally from said axis member, and a second portion extending from said first portion, in parallel alignment with said shaft, upward toward said handle end.

9. A weed removing device, comprising:

a shaft having a handle end and a blade end;

a handle located on said shaft at said handle end having two grip portions radially extending perpendicular to said shaft and opposite each other in a common plane;

blade means located at said blade end of said shaft, having an axis member extended axially from said shaft and a blade member extended laterally from said axis member; so that said blade end of said shaft is submerged into soil until said axis member is in close longitudinal juxtaposition with the main tap root of a weed to be removed, with each of said grip portions of said handle then turned to rotate said shaft, thereby cutting small lateral roots upon contact with and forward rotational force of said blade member and thereby also twisting the main tap root around said axis member, then removing the weed and root upon withdrawal of said device from the soil; and said blade means is further defined by a cable having a fastened end fixed to said blade member and a movable end looped around said axis member of said shaft and slidable along said axis member.

10. A method for removing weeds from soil, comprising:

inserting into soil, along the main tap root of a weed to be removed, a device having a shaft with an upper end and a lower end, said shaft further defined by a handle portion at said upper end and a blade portion at said lower end, said blade portion further defined by an axis member axially extended from said shaft, and a blade member, having laterally and vertically extending portions protruding laterally from said axis member, said lateral portion being shorter than said vertically extending portion, said vertical extending portion having a tapered edge;

turning said handle portion to rotate said shaft and thereby cutting small lateral roots growing out of the main tap root upon contact with said tapered edge of said blade member, and also thereby wrapping the main tap root to be removed around said axis member as said shaft is rotated; and pulling upward on said handle portion to extract the main tap root, wrapped around said axis member, out of the soil.

11. The method recited in claim 10, wherein the step of turning said handle portion includes rotating said handle portion and said shaft at least 360 degrees.

12. The method recited in claim 10, wherein the step of turning said handle portion includes rotating said shaft at least 360° by observing an indication marker on said handle portion corresponding to the position of said blade member.

13. The method recited in claim 10, wherein the step of turning said handle portion to rotate said shaft includes centering and pivoting said shaft on a blade axis tip extended axially from said axis member.

14. A method for removing weeds from soil, comprising:

inserting into soil, along the main tap root of a weed to be removed, a device having a shaft with an upper end and a lower end, said shaft further defined by a handle portion at said upper end and a blade portion at said lower end, said blade portion further defined by an axis member axially extended from said shaft, a blade member having a first portion extending laterally from said axis member and a second portion having a fixed end extending said second portion vertically upward from said first portion toward said upper end of said shaft in parallel alignment therewith, and a free end; said blade portion further defined by a cable having a fixed end secured to said free end of said second portion and a movable end looped around said axis member and slidable therealong;

turning said handle portion to rotate said shaft and thereby cutting small lateral roots growing out of the main tap root upon contact with said blade member, and also thereby wrapping the main tap root to be removed around said axis member, with the assistance of said cable, as said shaft is rotated;

pulling upward on said handle portion to extract the main tap root, wrapped around said axis member, out of the soil; and unwrapping the removed weed from said device and slidably moving said cable along said axis member to loosen and remove soil and debris from said device.

15. The method recited in claim 14, wherein the step of turning said handle portion includes rotating said handle portion and said shaft at least 360°.

16. The method recited in claim 14, wherein the step of turning said handle portion includes rotating said shaft at least 360° by observing an indication marker on said handle portion corresponding to the position of said blade member.

17. The method recited in claim 14, wherein the step of turning said handle portion to rotate said shaft includes centering and pivoting said shaft on a blade axis tip extended axially from said axis member.

* * * * *